United States Patent [19]
Bruschke et al.

[11] 3,839,987
[45] Oct. 8, 1974

[54] CONFECTION ENROBING APPARATUS

[75] Inventors: Joost M. M. Bruschke; Ronald E. Minor, both of Richmond, Va.

[73] Assignee: Eskimo Pie Corporation, Richmond, Va.

[22] Filed: May 4, 1972

[21] Appl. No.: 250,205

[52] U.S. Cl.................... 118/6, 118/16, 118/24, 118/324, 118/DIG. 4
[51] Int. Cl. ............................................. B05c 5/00
[58] Field of Search ............ 118/16, 24, 25, DIG. 4, 118/6, 324; 198/190, 31 AB

[56] References Cited
UNITED STATES PATENTS

| | | | |
|---|---|---|---|
| 991,919 | 5/1911 | Werner | 118/24 |
| 1,341,023 | 5/1920 | Sauy | 118/24 X |
| 1,932,158 | 10/1933 | Grieve | 118/24 X |
| 2,081,888 | 5/1937 | Birdsall | 118/16 |
| 2,745,538 | 5/1956 | Lamb | 198/190 X |
| 3,245,380 | 4/1966 | Carroll | 118/DIG. 4 |
| 3,340,992 | 9/1967 | Seragnoli | 198/31 AB X |
| 3,596,633 | 8/1971 | Porter et al. | 118/16 |

Primary Examiner—John P. McIntosh

[57] ABSTRACT

An apparatus and method for applying enrobing material to confections, particularly applicable to frozen confections, wherein freshly produced confections emerging continuously in seriatim from a confection producing equipment are segregated into groups of a predetermined number of abutting confections arranged on the feed conveyer in a line behind a stop. A pusher bar, extending parallel to and along one side of the line of confections, pushes the line of abutting confections transversely of the feed conveyer onto a spreader conveyer formed by an arrangement of endless belts arranged side-by-side in elongated loops to slightly diverge in a fan-like arrangement. The driven belts of the spreader conveyer separate the confections to form a line of extended length and deposits the line of separated confections on an open grid conveyer that carries the line of separated confections simultaneously through a downwardly flowing sheet of enrobing material overflowing from the lip of an elevated container to coat the top and sides of the line of confections and then through the top of a pool of enrobing material overflowing from an open top container over which the grid conveyer passes to coat the bottoms of the confections.

9 Claims, 15 Drawing Figures

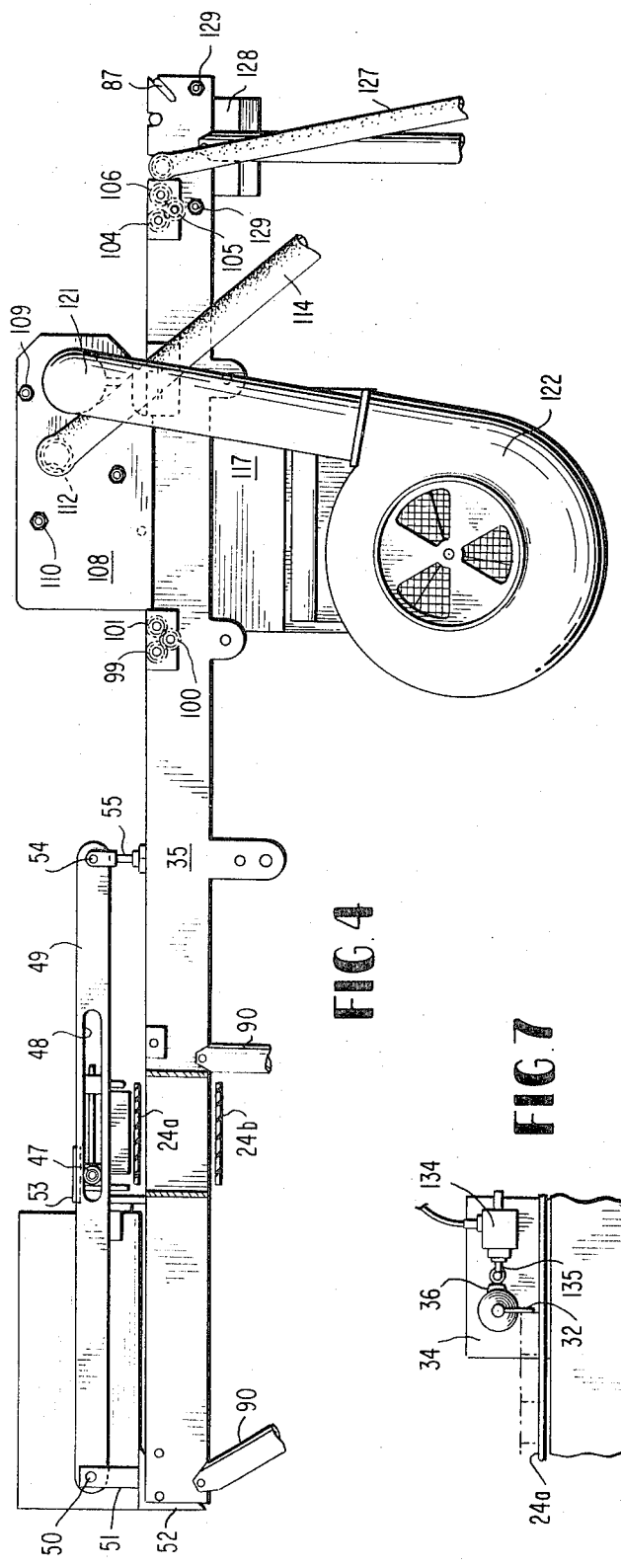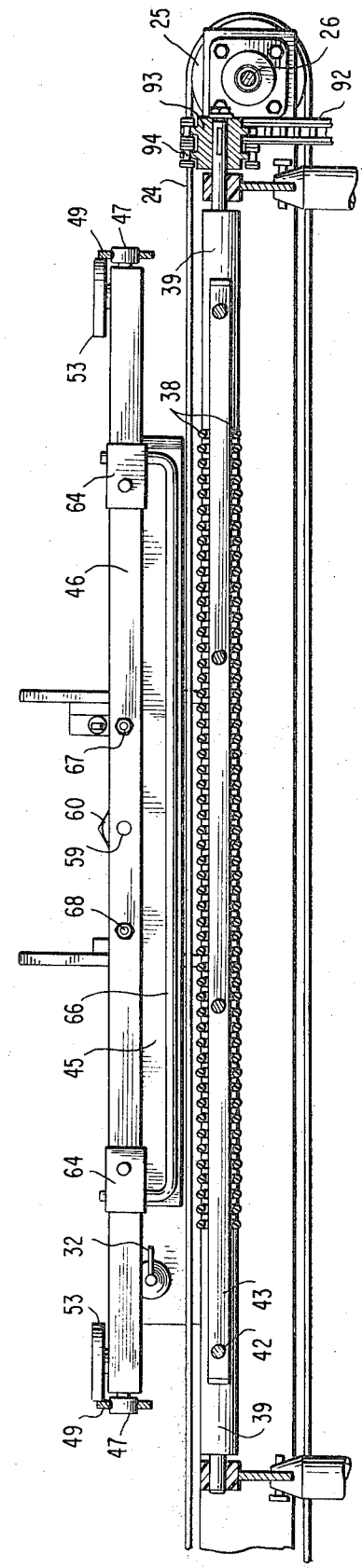

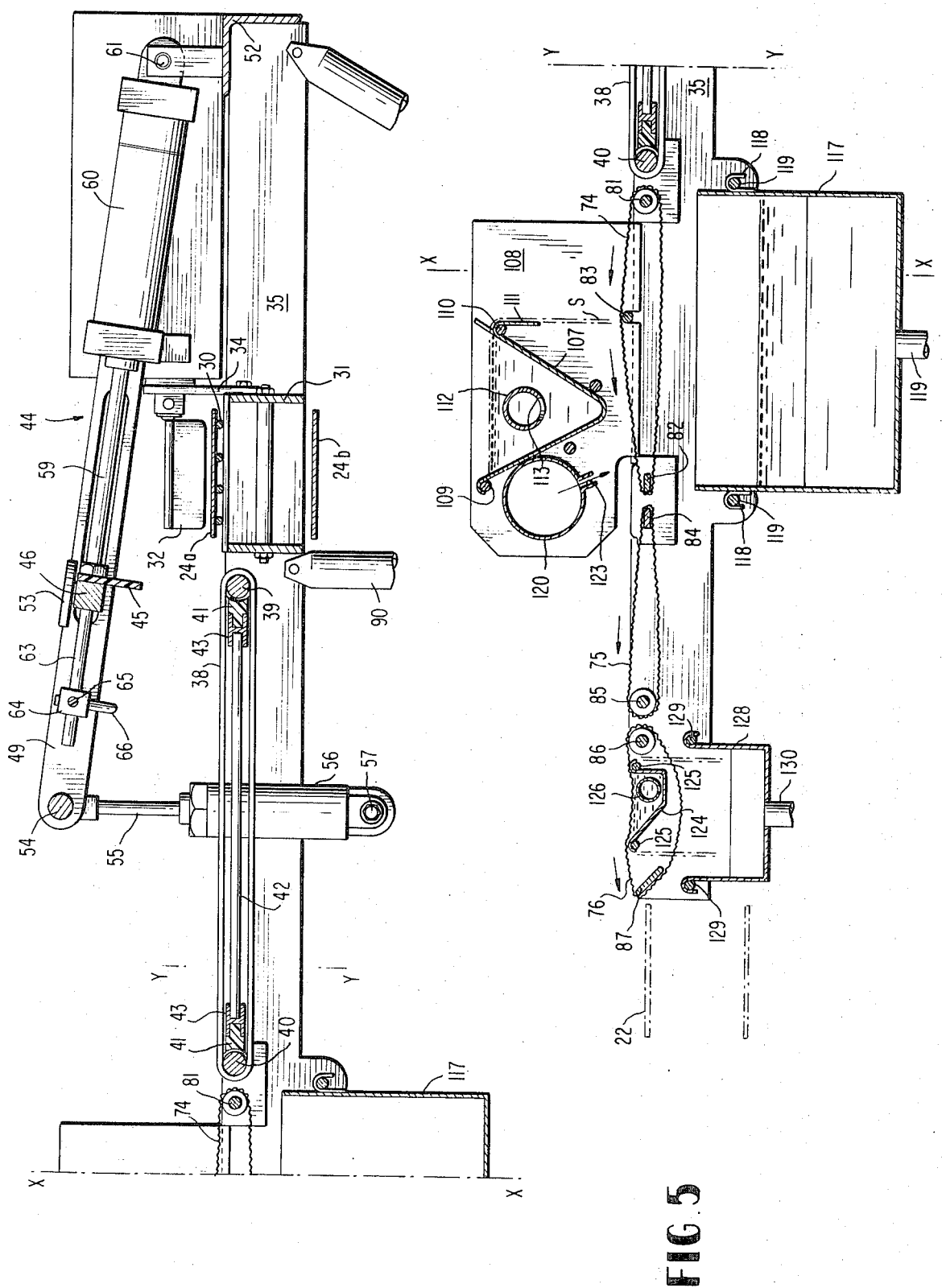

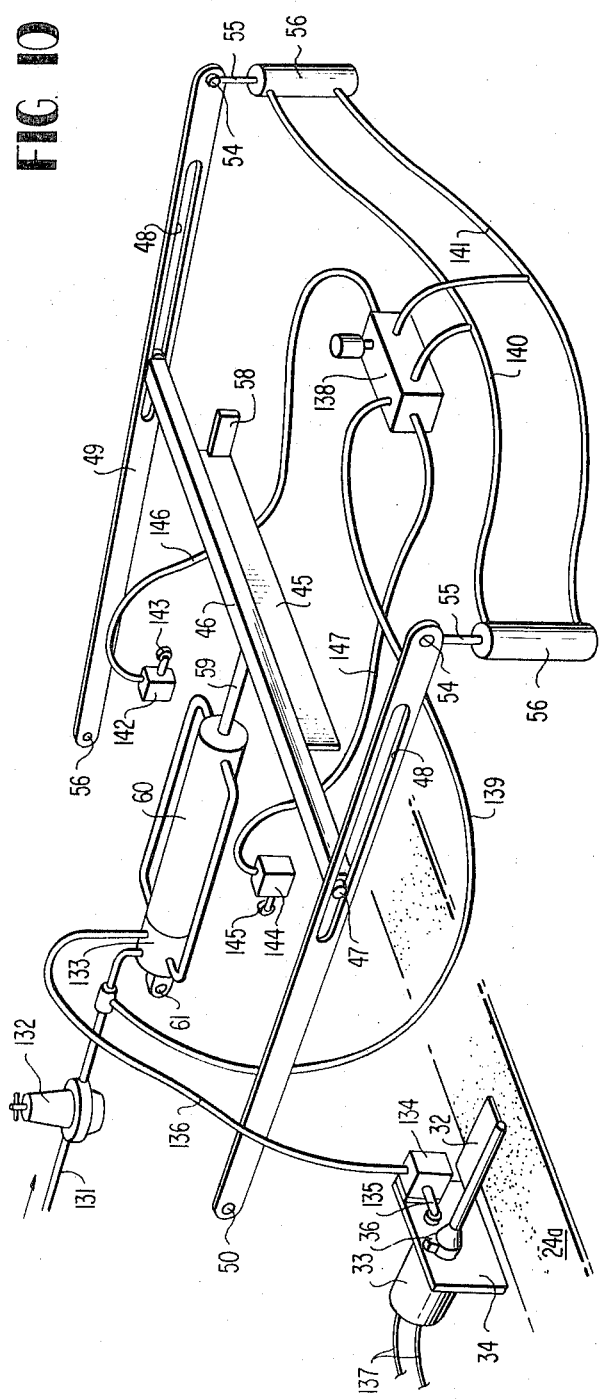
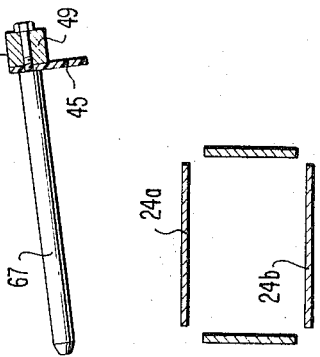
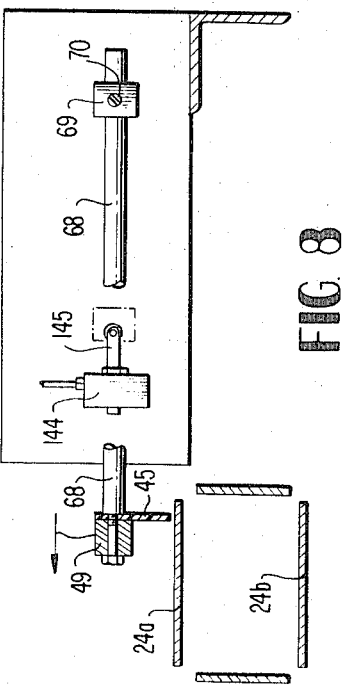

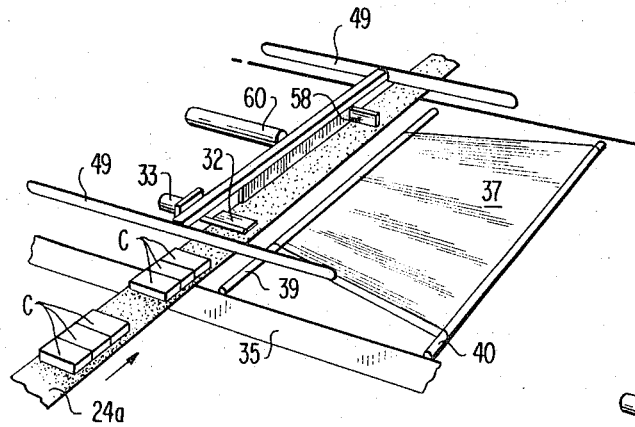
FIG. IIA
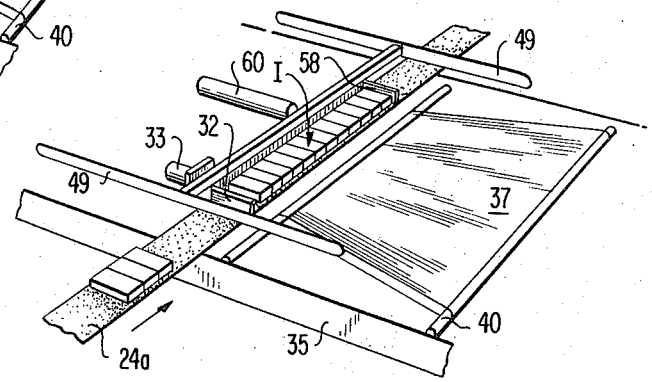
FIG. IIB
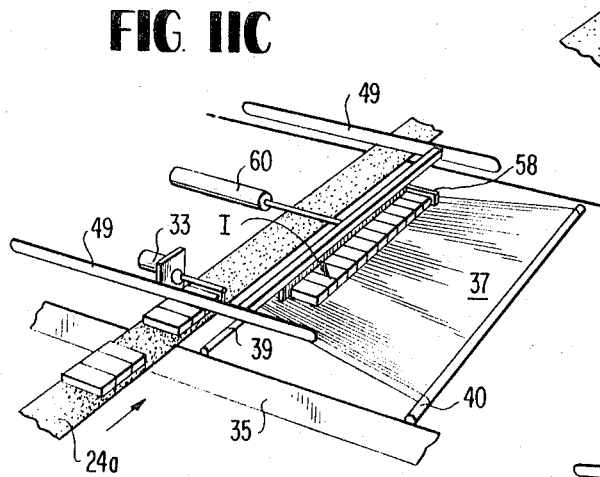
FIG. IIC
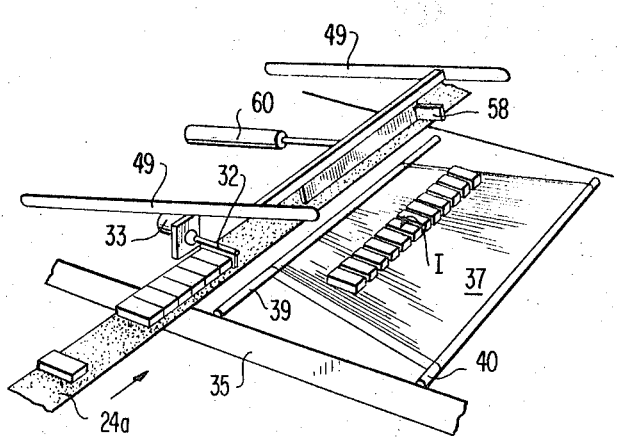
FIG. IID
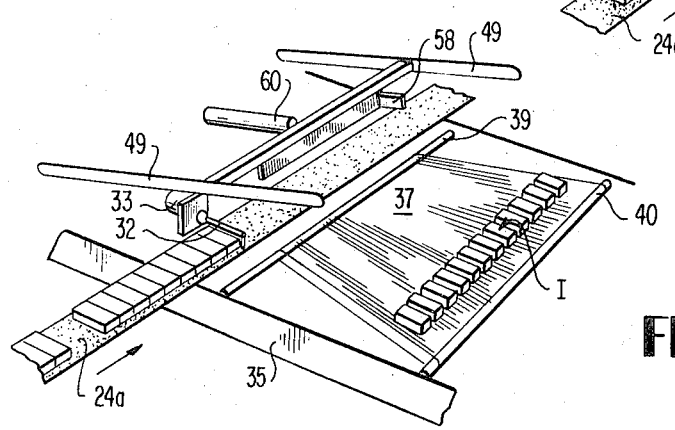
FIG. IIE

CONFECTION ENROBING APPARATUS

BACKGROUND OF THE INVENTION

This invention relates to an apparatus for applying enrobing material, such as chocolate, onto the exposed surfaces of confections and is particularly adapted to coating confections that are continuously produced at a high rate from a high capacity, automated frozen confection producing device, such as the equipment disclosed in U.S. Pat. No. 2,739,545 that produces ice cream bars by the extrusion process.

High capacity, frozen confection producing equipment automatically form confections made from a liquid or semi-frozen frozen confections sequentially as they emerge from the freezing chamber for further processing. If the hard frozen confections are to be coated with an enrobing material, it is the practice to deposit the confections in seriatim on a conveyer that carries the confections one after the other through an arrangement of spray heads that deposit a spray of enrobing material on the confections as they are carried in seriatim along the length of the enrober. Although the spike conveyer itself disclosed in U.S. Pat. No. 3,288,357 is not typical of conveyers, the enrobing device disclosed in this U.S. patent is typical of the general manner in which confections from automatic ice cream producing equipment are processed and a coating applied. The freezing machine referred to in U.S. Pat. No. 3,228,357 is the same type of confection producing equipment for which the following described enrober was conceived to improve its operational efficiency. A basic problem with enrobing apparatus that carries the confections in seriatim through the enrobing spray as the confections are removed from the confection producing equipment, as in U.S. Pat. No. 3,228,357, is that the conveyer that moves the confections through the enrobing bath must move at a rate to keep pace with the output of the confection producing equipment. When this equipment produces confections at a high rate, the confections must be carried by the enrobing conveyer at a similar high rate of speed through the enrobing spray. However, if the confections are carried through the enrobing bath at an excessive rate, an uneven and thin coating will be applied and sometimes there will be bare spots on the coating. This problem is particularly acute when the enrobing material is quite viscous in nature. The extrusion type of ice cream producing equipment disclosed in U.S. Pat. No. 2,739,545 is capable of producing frozen confections, such as ice cream bars, at a high rate. The rate of production of the confection producing equipment can be dictated by the maximum speed at which the line of confections coming from the confection producing equipment in seriatim can be moved through the enrobing bath and this is often less than the maximum output capacity of the confection producing equipment. Until the invention described herein was conceived, it was necessary to utilize more than one enrobing machine with high capacity confection producing equipment if the equipment operated at maximum capacity.

The typical and conventional enrobing equipment utilizes spray heads having a multitude of small apertures through which the enrobing material must flow to establish the spray impinging on the confections to establish the coating. For this reason particles of edible material, such as nut fragments or "crunch", cannot be mixed into the liquid enrobing material as it is sprayed onto the confections, as this solid matter would clog the spray heads.

A primary object of this invention is to provide an apparatus for forming an even coating of maximum desired thickness of enrobing material on the exterior surfaces of confections as they are continuously supplied at a high output rate from confection producing apparatus.

A further object of this invention is to provide an apparatus that will establish a relatively low rate of movement through an enrobing bath of confections that are continuously produced at a high output rate from confections producing equipment.

A further object of this invention is to produce an apparatus by which a high volume of confections can be passed through an enrobing bath at a sufficiently low speed to ensure a full coating of uniform depth having the desired thickness.

A still further object of the invention is to provide an apparatus by which enrobing material containing solid matter can be applied as a coating over the surfaces of a confection.

SUMMARY OF THE INVENTION

The previously described deficiencies of former enrobers and the above indicated objects have been achieved by the invention that is subsequently described in which the confections that are continuously emitted from the confection producing equipment are carried in seriatim along a feed conveyer and segregated into a group of abutting confections arranged along a line. As each group is formed on the feed conveyer, a pusher bar extending along one side of the line of confections pushes the confections transversely off the feed conveyer onto a fan-shaped spreader conveyer that carries the line of originally abutting confections transversely of the length of the line in slightly diverging directions to separate the adjacent confections from each other. The line of spaced-apart confections is then deposited on an open grid enrobing conveyer that carries the line of separated confections simultaneously through a downwardly flowing sheet of enrobing material overflowing over the lip of an elevated container transversely of the enrobing conveyer along the line of confections and then through the top of a pool of enrobing material that overflows through the grids of the enrobing conveyer from an open top container over which the conveyer passes. Since this arrangement permits a group of multiple confections to be passed simultaneously through the downwardly flowing sheet of enrobing material, the rate at which the line of confections moves through the sheet of enrobing material can be established at a much lower rate than that at which the individual confections are produced by the confection producing device and the overflow type of bath permits solid particles to be mixed into the enrobing material.

DESCRIPTION OF DRAWINGS

The features of the invention will become apparent to those skilled in the art upon reading the following detailed description of a preferred embodiment of the invention illustrated in the accompanying drawings in which:

FIG. 4 is a side view of the opposite side of the enrober from that of FIG. 3 along section line 4—4 of FIG. 1.

FIG. 5 is a longitudinal vertical section of the enrober along the longitudinal center line 5—5 of FIG. 1, but with the pusher bar extended as in FIG. 2.

FIG. 6 is a transverse vertical section of the enrober along section line 6—6 of FIG. 1.

FIG. 7 is a view of a segment at the left side of FIG. 6 in which a portion of the apparatus is cut away with the segregating gate in a different position than in FIG. 6.

FIG. 8 is a partial vertical longitudinal section along section line 8—8 of FIG. 1.

FIG. 9 is a partial vertical longitudinal section along section line 9—9 of FIG. 1 but with the pusher bar in the extended position of FIGS. 2 and 5.

FIG. 10 is a perspective view illustrating the basic pusher bar mechanism and its pneumatic actuating components.

FIGS. 11A – 11 E illustrate the pusher bar mechanism in the various positions constituting a cycle of operations.

In FIG. 1 the enrober 20 is shown located between the output end of the confection freezing chamber 21 from which newly produced frozen confections emerge and a conveyor 22 on which the freshly enrobed confections are transported to the packaging equipment. A feed conveyer 23, comprising an endless belt 24 having one end supported by the driving drum 25 with a drive shaft 26 supported from the enrober side frame 35 on the side opposite that facing the freezing chamber and the other end supported by an idler drum 27, extends transversely of the enrober from adjacent the freezing chamber outlet 21. Guide rails 28 are mounted on either side of the inlet end of the feed conveyer 23 by adjustable supports 29 by means of which the lateral spacing of the guide rails 28 can be adjusted to the width of the confections. As illustrated in FIG. 5, the upper run 24a of the feed conveyer belt rests on support rods extending transversely of the enrober on the feed conveyer frame 31, the lower run 24b of the conveyer belt returning below the support frame 31. A flat plate-like gate 32 is pivotally supported to extend outwardly from an actuator 33 supported from a mounting plate 34 extending vertically upwardly from the feed conveyer frame 31 with the gate 32 extending transversely across the upper run 24a of the feed conveyer a short distance inside the longitudinally extending side frame 35 of the enrober nearest the inlet of the feed conveyer 23. The gate actuator 33 pivots the gate 32 through 90° between the extended position of FIGS. 5 and 7 to block any movement of confections on the upper feed run 24a of the feed conveyer and a raised position shown in FIGS. 1 and 6 in which the gate 32 is parallel to the upper run 24a of the feed conveyer belt so as to permit passage of confections supported on the conveyer belt. A cam 36, whose function will be subsequently described, extends outwardly from one side of the gate 32 adjacent the mounting plate 34 in a location in which it can contact the actuating arm 135 of a valve 134 that will be subsequently described.

Figure 1:
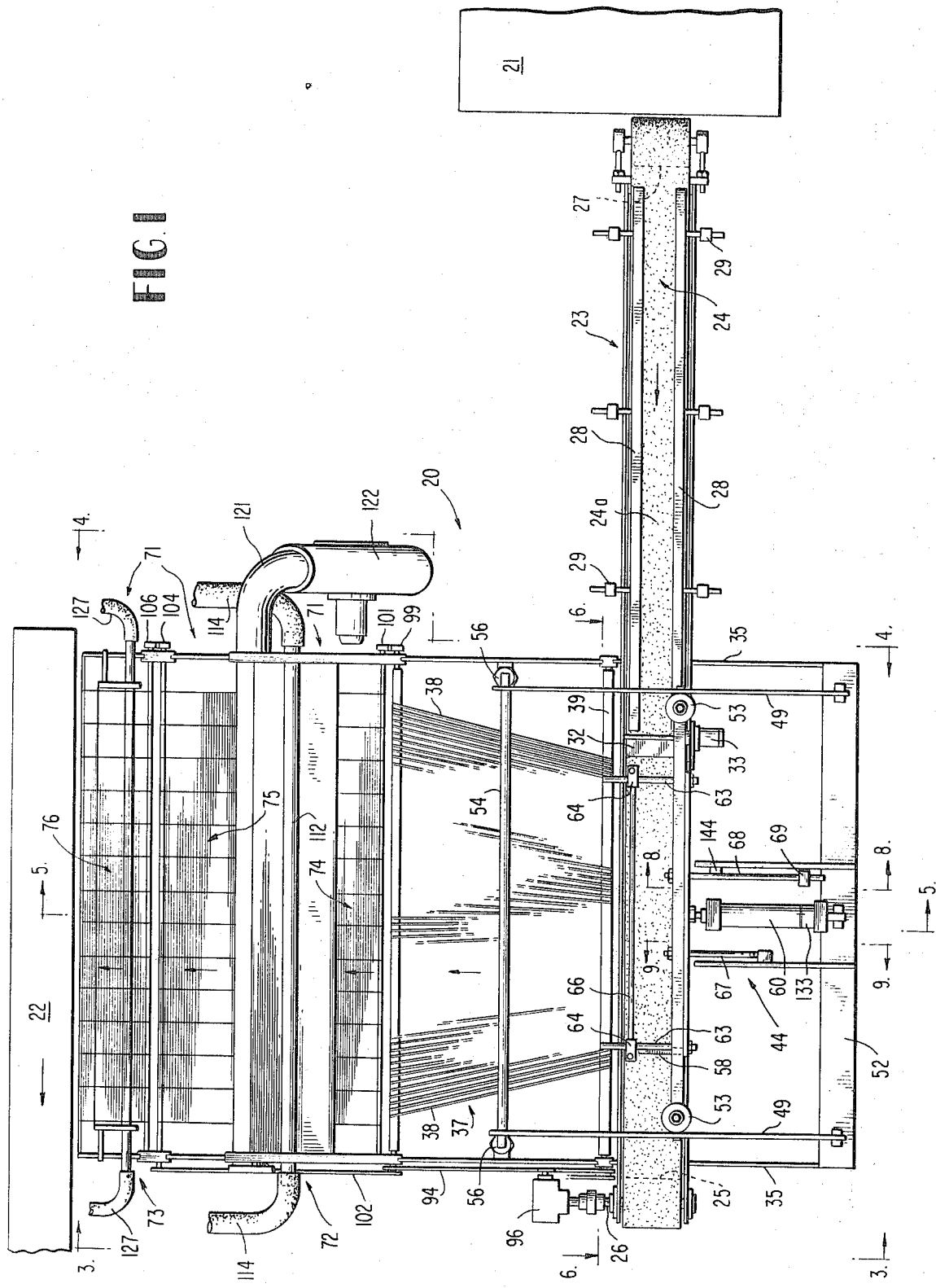
FIG. 1 is a plan view of the enrober located with respect to equipment and accessories with which it is associated.

A spreader conveyer 37 is located on a rear portion of the enrober frame immediately forwardly of the feed conveyer 23. The spreader comprises a plurality of endless cords or belts 38, preferably synthetic rubber O-rings, that are tightly stretched in a side-by-side arrangement between a lower drive rod 39 extending transversely of the enrober immediately adjacent the feed conveyer 23 and a transversely extending upper drive rod 40 that is spaced forwardly of the lower drive rod. The respective ends of the drive rods are journalled in bearings supported within the side frames 35 of the enrober, the drive rods each having a plurality of circumferential grooves spaced apart along their length in which the ends of the drive belts fit, the grooves of the lower drive rod 39 being more closely spaced than the grooves of the upper drive rod 40 so that the spreader belts are arranged in a slightly diverging, fan-like shape. To prevent the drive rods 39 and 40 from bending due to tension of the belts 38, a stiffener bar 41 contoured to the shape of the drive rods extends lengthwise along the major portion of each of the drive rods 39 and 40 on their facing sides and the separation between the stiffener bars 41 is maintained by spreader bars 42 that extend longitudinally of the spreader 37 between a fitting 43 affixed to each stiffener bar 41.

A pusher assembly 44 for transferring groups of confections carried by the feed conveyer 23 past the gate 32 onto the lower end of the spreader 37 is mounted on the lower end of the frame of the enrober in an overlying relationship to the feed conveyer 23 and the spreader 37. A vertically depending pusher bar 45, that extends approximately the width of the distance between the end belts 38 on the lower drive rod 39 of the spreader, extends downwardly from a cross support 46 that is supported at each end above and parallel to the feed conveyer 23 by rollers 47 that ride within slots 48 extending along a central portion of pusher frames 49 mounted on each side of the enrober parallel and adjacent to both side frames 35 of the enrober. The rear of each pusher frame 49 is pivotally connected by pivot 50 to a tab 51 that extends upwardly from a rear enrober transverse frame member 52 for pivotal motion of the pusher frames 49 about a horizontal axis through the pivot 50. A horizontally disposed roller 53 is rotatably mounted at each end of the cross support 46 and rides against the inside of each frame 49. The forward end of each pusher frame 49 is pivotally connected by a horizontally disposed cross rod 54 to a vertically extending piston rod 55 of the piston of a vertically mounted pneumatic pusher cylinder 56 of which the lower end of each has a pivotal connection 57 to opposite side frames 35 of the enrober. A stop bar 58 extends outwardly from the lower end portion of the pusher bar 45 at the end opposite the gate 32 to extend transversely across the upper run 24a of the feed conveyer belt in a position to block any confection on the feed conveyer from passing this point when the pusher assembly is in the retracted position of FIGS. 1 and 3. The forward end of the piston rod 59 of an actuating cylinder 60 for the pusher is connected to the midpoint of the cross support 46 and the rear of the pneumatic cylinder 60 which extends midway of and parallel to the pusher frames 49 has a pivotal connection 61 to a tab 62 that extends vertically upwardly from the enrober transverse frame member 52 in line in with rear pivotal connections 50 of the pusher frames 49. A rod 63 extends forwardly from the front face of the pusher cross support 46 adjacent each end of the pusher bar 45. A block 64 is slidably mounted on each of the two rods 63 and is lockable thereto at any selected position by a locking screw 65. An elongated, U-shaped guide bar 66 is dependingly supported at each end by the blocks 64 for adjustment of the guide bar to a spacing from the pusher plate 45 that will accommodate the width of the confection being processed. Two switch actuating rods 67 and 68 extend rearwardly through the pusher cross support 46 on either side of and parallel to the centrally located pusher actuating piston rod 59, one of the switch actuating rods 68 being longer than the other and having a block 69 slidably mounted on the end and lockable at a selected position by means of a locking screw 70. The functions of the switch actuating rods and the block mounted on one will be subsequently discussed relative to the operation of the pusher assembly.

A three section, open grid enrobing conveyer 71 is supported by the frame of the enrober forwardly of the spreader 37 and carries confections from the spreader 37 through the top coater 72 and the bottom coater 73 of the enrober. All three sections of the enrobing conveyer 71, comprising the initial conveyer segment 74, the intermediate conveyer segment 75 and the final conveyer segment 76 are open-grid, endless belts formed from wire 77 that is twisted together at intervals in an interlocking arrangement to leave voids 78 of relatively large size as compared to the diameter of the interlocking wires 77. The segments of the enrobing conveyer 71 have longitudinally extending panels of which the edges 79 are defined by the interconnecting wires of the adjacent panels and these longitudinally extending panel edges 79 are supported by rollers 80 spaced along the length of a transversely extending drive rod 81, 85, 86 for each of the three enrobing conveyer segments. The drive rod 81 of the initial conveyer segment 74 extends transversely of the enrober immediately forwardly of the spreader upper drive rod 40 and is journalled at each end in bearings supported by the enrober side frames 35. The forward end of the initial conveyer segment 74 extends around and is supported by a cross bar 82 that extends transversely of the enrober between the side frames 35. At a midpoint the upper run of the initial conveyer segment rides over the top of a transversely extending rod 83 that is affixed to the enrober frame at an elevation slightly above that of the rollers 80 and the cross bar 82. The intermediate conveyer segment 75 is supported in a similar manner to and forwardly of the initial conveyer segment 74 but in a reversed arrangement with a transversely extending cross bar 84 immediately ahead of the cross bar 82 of the initial conveyer segment and a drive rod 85 along which spaced rollers 80 support the leading edge of the intermediate conveyer segment 75. Immediately ahead of the intermediate conveyer segment 75 the final segment 76 of the enrobing conveyer is supported as a horizontally extending, loosely arranged loop by the rollers 80 spaced along a transversely extending drive rod 86 located immediately forwardly of the drive rod 85 of the intermediate conveyer segment and a transversely extending cross bar 87 spaced ahead of the drive rod 85 at the forward end of the loop formed by the final conveyer segment 76. The cross bar 87 is tilted downwardly with the forward end of the final conveyer segment riding against the downwardly angled underface of the support bar 87 as shown in FIG. 5.

Figure 2:
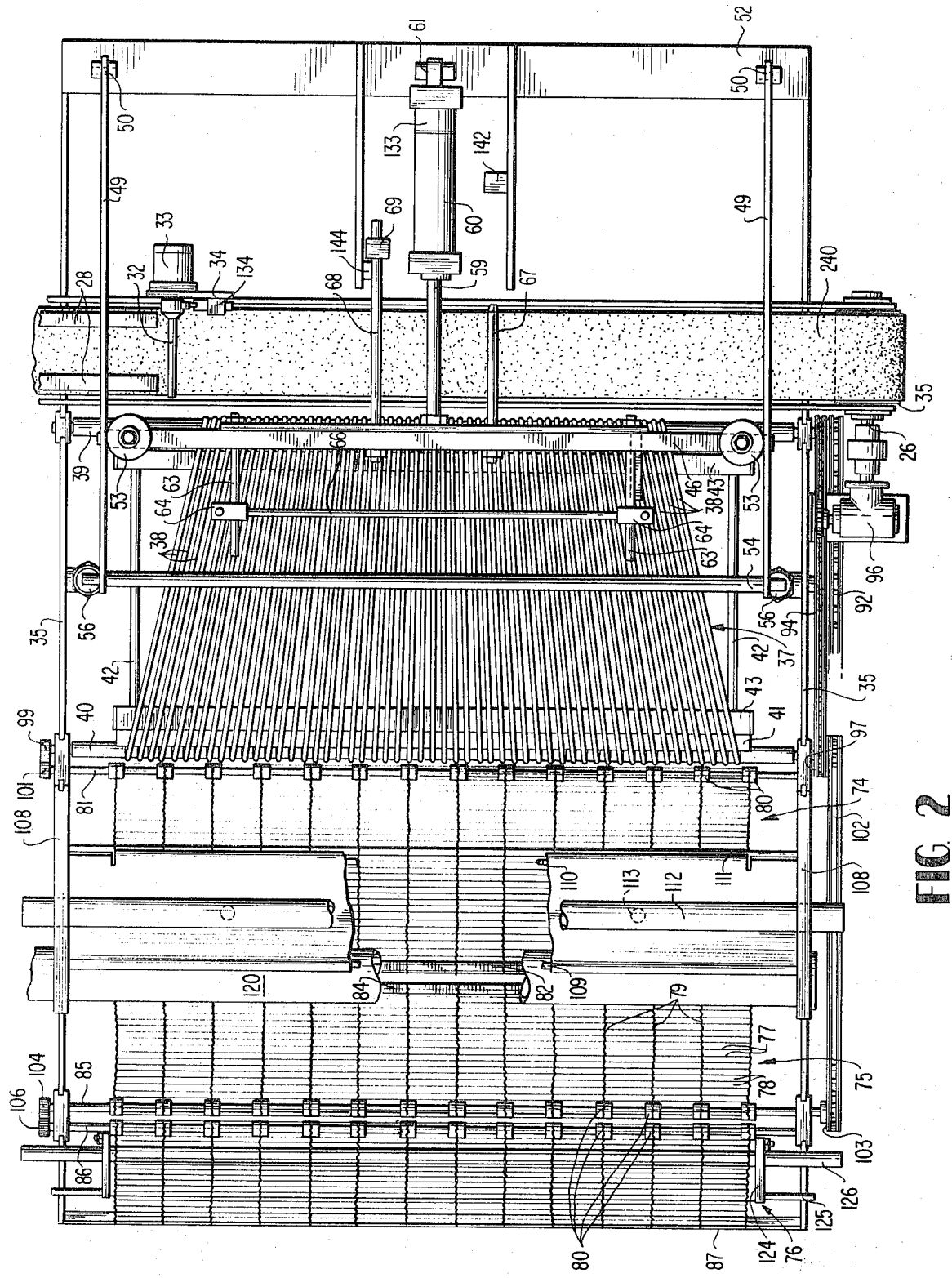
FIG. 2 is a plan view of the enrober in somewhat larger detail than FIG. 1 with a central portion of the enrober cut away and the pusher bar in an extended position rather than the retracted position of FIG. 1.
Figure 3:
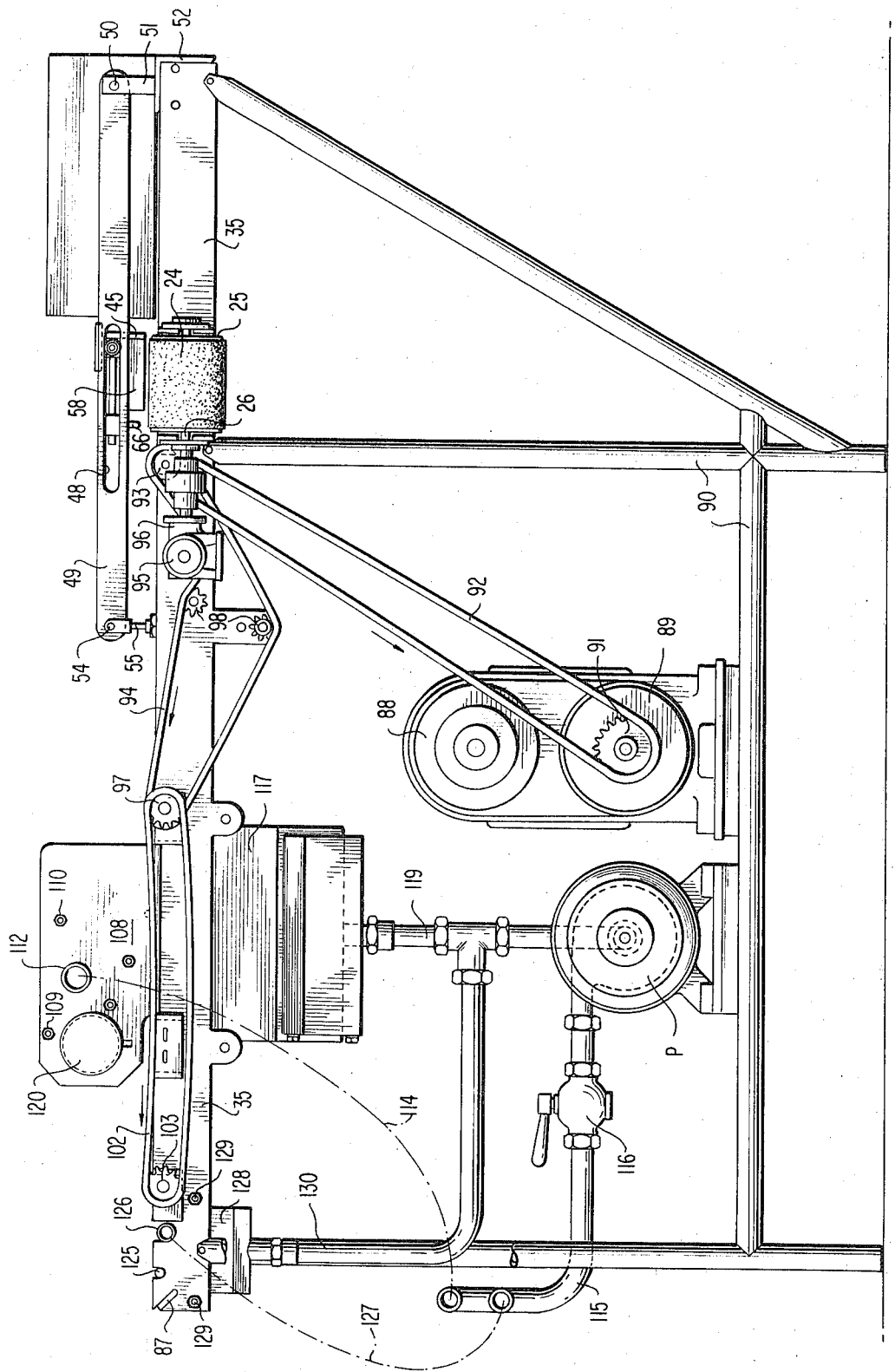
FIG. 3 is a side view of the enrober along section line 3—3 of FIG. 1.

The drive system for driving the feed conveyer 23, the belts of the spreader 37 and the three segments 73 - 75 of the enrobing conveyer 71 in the directions indicated by the arrows on the drawings are best understood with reference to FIGS. 2 and 3. A motor 88 drives a variable speed drive unit 89 that is mounted on a platform supported on a lower portion of the foundation frame 90 of the enrober. A drive sprocket 91 of the variable speed unit engages one end of an endless drive chain 92 of which the other end engages the outer row of teeth of a double drive sprocket 93 keyed to one end of the spreader lower drive rod 39. The double drive sprocket 93 has an inner row of teeth that engage one end of an endless, intermediate drive chain 94 extending forwardly outside the enrober side frame 35 in engagement with the teeth of a drive sprocket 95 connected through a gear box 96 to the drive shaft 26 of the feed conveyer 23, the forward end of the chain 92 being supported by the inner row of teeth of a double drive sprocket 97 and intermediate portions of the chain 94 being routed over idler sprockets 98. A gear 99 keyed to the opposite end of the spreader upper drive rod 40 from the double sprocket 97 meshes with an idler gear 100 that in turn drives the gear 101 keyed to the drive rod 81 of the initial segment 74 of the enrobing conveyer. The outer row of teeth of the double drive sprocket 97 engage one end of a forward drive chain 102 that extends forwardly along the side frame 35 of the enrober around a drive sprocket 103 keyed to the drive rod 85 of the intermediate segment 75 of the enrobing conveyer. A gear 104 keyed to the oppsoite end of the drive rod 85 from the sprocket 103 engages an idler gear 105 that in turn meshes with the gear 106 that is keyed to the drive rod 86 of the final segment 76 of the enrobing conveyer.

The top coater 72, that coats the tops and sides of the confections enrobing material, is located above the initial segment 74 of the enrobing conveyer. A trough 107 extends transversely of the enrobing conveyer between the bulkheads 108 affixed to and extending upwardly from the side frame 35 on each side of the enrober and is supported by cross rods 109 and 110 on which rest a downwardly curved portion of the top longitudinal edges of the trough 107. The central, major portion of the top longitudinal edge of the trough that faces rearwardly of the enrober is bent downwardly around the rear cross rod 110 to form a vertically extending lip 111 of which the top edge is somewhat lower than the other sides of the trough 107 so that liquid filling the trough will overflow over the top edge of the lip 111 and be directed by the lip as a downwardly flowing thin sheet S of liquid extending transversely of the enrobing conveyer. A supply pipe 112 with perforations 113 extends longitudinally of the trough 107 below the level of the top of the lip 111 and extends through the bulkheads 108 that abut each side of the trough. A supply line 114 extends from each end of the supply pipe 112 along the dotted line of FIG. 3 to the line 115 that connects through a shutoff valve 116 to the pressure side of a feed pump P. An overflow bin 117 with an open top is located below the bottom run of the initial enrobing conveyer segment 74 to extend substantially the breadth and width of the initial conveyer segment, the bin being supported by the ears 118 that overlie cross rods 119 extending transversely of the enrober between the opposite side frames 35. A drain line 119 extends from the bottom of the overflow bin to the suction side of the feed pump P.

A blow pipe 120, overlying the initial segment 74 of the enrobing conveyer, extends between the opposing bulkheads 108 ahead of the trough 107 at the forward portion of the initial conveyer segment 74 with one end being connected through the line 121 to an air blower 122. A slotted opening 123 extends longitudinally along a bottom portion of the blow pipe and is directed in the direction of the arrow in FIG. 5 onto the enrobing conveyer at an acute angle to the vertical directed oppositely of the direction of enrobing conveyer movement.

The bottom coater 73 of the enrober comprises an open top container 124 extending transversely between the enrober side frame 35 and supported by the cross rods 125. The container 124 is located within the loop of the final segment 76 of the enrober conveyer with the top run of the conveyer resting on the upper longitudinal edges of the container 124. A preforated supply pipe 126 extends lengthwise of the bottom coater container 124 below the level of the top of the container and both ends of the supply pipe are connected by lines 127 to the main supply 115 connecting to the pump P. A sump 28 supported by the cross rods 129 is located below the lower run of the final segment 76 of the enrober conveyer to extend substantially the length and breadth of the final conveyer segment. A drain line 130 joins the bottom of the sump 128 to the suction side of the pump P.

The pneumatic operating system for the pusher assembly 44 is illustrated in FIG. 10. An air supply line 131 from a high pressure air source (not illustrated) connects through a shut off valve 132 to a control valve 133 on the rear of the pusher actuator cylinder 60. A three-way valve 134 having an actuating arm 135 is mounted on the mounting plate 34 in a position to be actuated by the cam 36 of the gate 32 and is connected by the line 136 to the control valve 133. The gate actuator 33 is connected by lines 137 to a gate control (not illustrated) actuated by the conveyer that carries the confections through the freezing chamber 21. A four-way valve 138 connects through the pressure line 139 to the air supply line 131 and also connects through lines 140 and 141 to opposite ends of the vertically located pneumatic pusher cylinders 56 of which the piston rods 55 connect to the forward ends of the pusher frames 49. A three-way valve 142, with actuating arm 143, is located in the line of movement of the switch actuating rod 67 and another three-way valve 144 with an actuating arm 145 is located in the line of movement of the block 69 mounted on the other switch actuating arm 68. Both three-way valves 142 and 143 are connected by lines 146 and 147, respectively, to the four-way valve 138.

The enrobing apparatus, that has been previously described, can be utilized in applying an enrobing material, such as chocolate, as a coating on frozen confections of which ice cream bars are typical. Such confections can be produced in various ways, such as in molds or the extrusion process described in U.S. Pat. No. 2,739,545. The apparatus disclosed in the aforesaid U.S. Pat. No. 2,739,545, commonly known in the trade as an Eskimo machine, can be used very effectively with the previously described enrober since the enrober of this invention makes it possible to operate the Eskimo machine at its maximum rate of output. The hard frozen confections from the freezing chamber 21 of an Eskimo machine, schematically illustrated in FIG. 1, are removed from the pallets of the machine and transferred onto the belt 24 of the feed conveyer 23 by a removal device (not illustrated). The frozen confections C are carried by the upper run 24a of the feed conveyer onto the lower end of the enrobing apparatus in the manner illustrated in FIG. 11A, the confections in this particular illustration being of a size that three are carried by each pallet of the Eskimo machine. Obviously the number and size of the confections carried by a pallet can vary. The guide rails 28 on either side of the initial portion of the feed conveyer 23 are separated a distance to accommodate the width of the confection being produced to center them along the belt of the conveyer and the position of the guide bar 66 on the pusher is accordingly adjusted to the width of the confections. When the initial batches of confections from the Eskimo machine are transported along the upper 24a of the feed conveyer in the direction indicated by the arrow in FIG. 11A, the gate 32 is in the illustrated raised position so that the confections C are carried by the conveyer past the gate toward the stop 58 which prevents any further movement of the confections past that point. The gate actuator 33 is connected by the lines 37 to the gate control device (not illustrated) on the Eskimo machine that causes the gate to be raised and lowered by means of the actuator 33 in a timed relationship as will permit the requisite number of confections to pass beyond the gate to form an abutting line of confections behind the stop 58 which is substantially no longer than the space between the endmost belts 38 at opposite end portions of the lower drive rod 39 of the spreader 37. The speed of the enrober conveyers is adjusted through the variable speed drive 89 to be synchronized with the rate at which the conveyer of the Eskimo machine moves the pallets through the freezing chamber and discharges the confections onto the feed conveyer 23. The gate control device operated by the pallet conveyer of the Eskimo machine is set to actuate the gate actuator 33 and move the gate 32 to the lowered position to block the passage of any further confections past the gate when the requisite number of confections to form a group I passes the gate, as illustrated in FIG. 11B. Movement of the gate 32 to the lowered position brings the cam 36 into contact with the actuator arm 135 of the three-way valve 134 (see FIG. 7), which connects the valve to a vent position that is transmitted through the connecting line 136 to the spindle valve of the control valve 133 of the pusher actuating cylinder 60 and causes the spindle valve to shift and admit high pressure air into the cylinder 60 on that side of the piston as will move the piston to the forward, extended position illustrated in FIG. 11C, thus pushing the pusher bar 45 and the confections aligned ahead of the bar onto the lower end of the spreader 37 with the abutting line of confections resting on the belts 38 of the spreader. Movement of the pusher bar 45 to the extended position carries the block 69 on the switch actuating rod 68 forwardly to the dotted position shown in FIG. 8 in contact with the actuator arm 145 of the three-way valve 144. Actuation of the up-valve 144 shifts the four-way valve 138 to admit high pressure air from the line 139 to the line 145 connecting to the bottom of the vertical lifting cylinders 56 and move the pistons and piston rods 55 connected to the forward end of the pusher frames 49 vertically to the upper position illustrated in FIG. 11D. Upon the piston of the pusher actuating cylinder 60 reaching the forward extended position, pressure is admitted to the spindle valve of the control valve 133 and the spindle valve is returned to the other position so as to admit high pressure air to the forward end of the pusher actuating cylinder 60 and return the piston and pusher bar 45 to the retracted position illustrated in FIG. 11E. Upon reaching the retracted position, the end of the switch actuating rod 67 of the pusher contacts the actuating arm 143 of the threeway valve 142, as indicated in the uppermost dashed lines in FIG. 9. Actuation of the three-way valve 142 operates the fourway valve 138 to shift the high pressure air to the line 140 connecting to the top of the lifting cylinders 56 and move the pusher frames 49 and pusher bar 45 downwardly to the original lowered position illustrated in FIG. 11A, with the pusher bar 45 rearwardly of the line of incoming confections carried by the feed conveyer 23 and the stop 58 in the position to block the movement of confections and establish another group of confections of a same predetermined number. During the period when the pusher is being extended and retracted, the gate 32 in the extended position of FIGS. 11B – 11D will block the movement of confections past the gate 32. The gate control device of the Eskimo machine then actuates the gate actuator 33 to rotate the gate 32 to the raised position of FIG. 11A and confections are permitted to flow under the raised gate and along the feed conveyer 23 toward the stop 58. Upon the gate control device of the Eskimo machine next actuating the gate actuator 33, the previously described cycle is repeated.

Due to the divergence of the cords or belts 38 that form the spreader 37, when the abutting line of confections of group I segregated on the feed conveyer between the stop 58 and the gate 32 are pushed by the pusher assembly 44 onto the lower edge of the spreader 37, the motion of the belts of the spreader 37 move the abutting confections toward the enrobing conveyer 71 and simultaneously open a space between adjacent confections in the manner illustrated in FIGS. 11B and 11E. Upon passing over the upper drive rod 40 of the spreader 37, the line of confections is transferred onto the open grid of the initial segment 74 of the enrobing conveyer which is moving in the direction of the arrows toward the forward portion of the enrober. The spaced-apart confections are carried by the enrobing conveyer beneath the top coater 72 and the spaced-apart confections of the line pass simultaneously through the sheet S of enrobing material overflowing from the trough 107 and flowing downwardly from the transversely extending lip 111. Since the first portion of the enrobing conveyer 74 is angled slightly upwardly in passing over the elevating bar 83 located beneath the lip 111 of the trough, the front face of each confection will be tilted upwardly at a small angle when passing through the sheet S of enrobing material to ensure good coverage and, similarly, the rear face of each confection is tilted slightly upwardly when passing through the sheet S of enrobing material due to the downward inclination of the enrobing conveyer segment 74 upon passing the elevating bar 83. The excess enrobing material that does not stick to the confection drips through the open spaces of the initial segment 74 of the enrobing conveyer into the overflow bin 117 from whence it is circulated through the drain line 119 through the pump P and recirculated again to the coaters 72, 73. The volume of enrobing material and pump capacity are maintained at a level which will maintain a constant overflow from the trough 117 of the top coater so as to maintain a continuous sheet S of enrobing material flowing downwardly transversely of the enrobing conveyer initial segment 74. If desired, solid particles of edible matter, such as nuts or "crunch" can be mixed into the enrobing material and will not clog the system as there are no small spray openings. A conventional heater (not illustrated) can be incorporated in either or both the overflow bin 117 and the and the trough 107 if the nature of the enrobing material requires that it be heated above room temperature. Upon passing beneath the top coater trough 107, the line of confections, having their top and side faces coated with the enrobing material, pass through a blast of air emitted from the slotted opening 123 of the blow pipe 120, the blast of air supplied from the blower 122 leveling and smoothing the coating of enrobing material on the top and sides of the confections and any excess liquid being caught by the overflow bin 117. After passing beneath the blow pipe 120, the line of confections is transferred from the initial segment 74 of the enrobing conveyer to the immediate segment 75 and carried forwardly in the direction of the arrow toward the final segment 76 of the enrobing conveyer and transferred to the final segment of the enrobing conveyer for movement through the pool of enrobing material provided by the bottom coater 73. The open top container 124 of the bottom coater is filled to overflowing with enrobing material from the pump P so that the bottom of the confections are carried through a shallow pool of enrobing material on the open grid of the final enrobing conveyer segment 76 as it passes across the top of the bottom coater container 124, the overflowing coating material welling up through the open grids of the conveyer onto the bottom of the confections as it overflows to drain downwardly over the forward and rear edges of the container 124 into the sump 128 from which the excess material flows back to the pump P through the drain line 130. The line of confections, that are now coated on all sides, are then carried across the forward support bar 87 at the front edge of the enrober and deposited on the conveyer 22 for transportation to a packaging station or other desired location.

Although the operation of the described invention is described in connection with the operation of an Eskimo machine, the invention can be utilized with any type of confection producing equipment. It should be understood that the foregoing disclosure relates only to one embodiment of the invention and that numerous modifications and variations may be made by those skilled in the art without departing from the spirit and scope of the invention as set forth in the appended claims.

What is claimed is:

1. An apparatus for enrobing confections comprising means for supporting a multiple arrangement of laterally spaced, endless conveyor belts in a juxtaposed, diverging array with one end of the belts forming a common entrance edge transversely of said array and being more closely spaced than the other end of the belts forming a common exit edge transversely of said array, means for continuously moving said conveyor belts between said common entrance and said common exit edges, feed means for conveying a plurality of unevenly spaced confections from a supply source to a position closely adjacent said diverging belt array entrance edge, means for segregating a predetermined number of the unevenly spaced confections on said feed means in a seriatim, abutting relationship between the two ends of said diverging belt array entrance edge, means for transferring the segregated and abutting line of confections from said feed means onto said diverging belt array to extend transversely thereof, an enrobing conveyor immediately adjacent the exit edge of said diverging belt array having a conveying surface and means for continuously moving said surface away from said diverging belt array, and enrobing means supported above and below said enrobing conveyor surface transversely thereof for bringing enrobing material into contact with all surfaces of confections conveyed by said enrobing conveyor past said enrobing means.

2. The apparatus of claim 1 wherein said feed means is a continuously moving feed conveyor having a conveying surface moving transversely of said diverging belt array, and said segregating means comprises two, spaced-apart gate means overlying said feed conveyor surface, a first of said gate means being located between the ends of said diverging belt array entrance edge adjacent that end of said entrance array in the direction of said feed conveyor movement in a position to prevent the further passage of confections along said feed conveyor, a second of said gate means being located adjacent that end of said diverging belt array entrance edge opposite the direction of said feed conveyor movement and being mounted for movement between a blocking position preventing the further passage of confections on said feed conveyor and an open position permitting free passage of confections on said feed conveyor, and means for selectively moving said second gate means from said open to said blocking position upon a predetermined number of confections passing from said supply source onto said feed conveyor and returning said second gate from said blocking to said open position upon operation of said transfer means in transferring the segregated line of confections onto said diverging belt array.

3. The apparatus of claim 2 wherein said arrangement of conveyor belts comprises a plurality of endless belts arranged as elongated loops in juxtaposed, vertical planes with the loops at one end of said belts constituting said entrance edge of the array being more closely spaced around a common supporting rod than the other ends of the loops supportingly arranged around a supporting rod at said exit edge of the array, said supporting rods extending transversely of said array and connected to a driving means for rotation at a constant speed, and said abutting confection moving means comprises a pusher bar parallel to said feed conveyor and supported for movement between a retracted position adjacent the edge of said feed conveyor opposite said diverging belt array and an extended position overlying said diverging belt array beyond its entrance edge, and means for moving said pusher bar between said retracted and extended positions.

4. The apparatus of claim 3 wherein said pusher bar is supported for movement between a lowered position with the lower edge of the bar immediately adjacent the level of said feed conveyor surface and said diverging belt array entrance edge and a raised position in which the lower edge of said pusher bar is above the level of its lowered positions, and means for moving said pusher bar from said lowered position to said raised position upon said pusher bar reaching said extended position and moving said pusher bar to said lowered position after said bar is retracted from said extended position to said retracted position.

5. The apparatus of claim 4 wherein said first gate means is a stop affixed to said pusher bar to extend across said feed conveyor at the level of the confections when said pusher bar is in its lowered position, said pusher bar is supported at each end for movement along the length of a support arm extending transversely of said feed conveyor and pivotally mounted at one end on a support frame rearwardly of said feed conveyor for motion in a vertical plane, the other end of each said support arm is connected to the piston of a vertically oriented reciprocating motor, said pusher bar is connected to the piston of a horizontally oriented reciprocating motor mounted for limited motion in a vertical plane, a first control means actuated by movement of said second gate means is connected between said second gate means and said horizontally oriented reciprocating motor for initiating forward motion of the motor piston of said horizontally oriented reciprocating motor upon said second gate means moving to its blocking position to move the pusher bar along said support arms to its extended position and reversing the motion of said motor piston after having reached the extended position to return the pusher bar to its retracted position, and second control means actuated by movement of said pusher bar is connected to said vertically oriented reciprocating motors for initiating upward movement of the pistons of said vertically oriented reciprocating motors upon said pusher bar reaching its extended position to move the piston and the pivoting support arms from their lowered to their raised positions and for initiating downward movement of the pistons of said vertically oriented reciprocating motors upon said pusher bar returning to its retracted position from the extended position.

6. The apparatus of claim 5 wherein said enrobing conveyor comprises at least one elongated endless belt of open grid mesh, supported in the form of an elongated loop, and said enrobing means comprises a first container supported above said enrobing conveyor and extending transversely thereof, said container having an open top in which one upper edge comprises a lip extending transversely of said enrobing conveyor at a lower level than the remaining upper side edges of the container, means continuously feeding enrobing material into and filling said first container to overflow over said lip, the level of the open grid mesh of said enrobing conveyor beneath said lip being higher than the level of said grid mesh at points on the conveyor spaced in both directions thereof in the line of conveyor movement, a second container supported below said enrobing conveyor beyond said first container in the direction of conveyor movement and having an open top extending transversely of the enrobing conveyor, the open grid mesh of said enrobing conveyor loosely lying across and contacting the first and rear edges of said second conveyor open top, and means continuously feeding liquid enrobing material into and filling said second container to overflow, whereby the bottom surfaces of the confections supported on said enrobing conveyor mesh pass through the pool of overflowing enrobing material of said second container.

7. The apparatus of claim 4 wherein said enrobing conveyor comprises at least one elongated endless belt of open grid mesh supported in the form of an elongated loop, and said enrobing means comprises a first container supported above said enrobing conveyor and extending transversely thereof, said container having an open top in which one upper edge comprises a lip extending transversely of said enrobing conveyor at a lower level than the remaining upper side edges of the container, means continuously feeding enrobing material into and filling said first container to overflow over said lip, the level of the open grid mesh of said enrobing conveyor beneath said lip being higher than the level of said grid mesh at points on the conveyor spaced in both directions thereof in the line of conveyor movement, and bottom enrobing means located below said enrobing conveyor for bringing enrobing material into contact with the bottom surface of confections supported on the wire mesh of said enrobing conveyor.

8. The apparatus of claim 2 wherein said enrobing conveyor comprises at least one elongated, endless belt of open grid mesh supported in the form of an elongated loop, and said enrobing means comprises a first container supported above said enrobing conveyor and extending transversely thereof, said container having an open top in which one upper edge comprises a lip extending transversely of said enrobing conveyor at a lower level than the remaining upper side edges of the container, means continuously feeding enrobing material into and filling said first container to overflow over said lip, the level of the open grid mesh of said enrobing conveyor beneath said lip being higher than the level of said grid mesh at points on the conveyor spaced in both directions thereof in the line of conveyor movement, and bottom enrobing means located below said enrobing conveyor for bringing enrobing material into contact with the bottom surface of confections supported on the wire mesh of said enrobing conveyor.

9. The apparatus of claim 8 wherein said bottom enrobing means comprises a second container supported below said enrobing conveyor beyond said first container in the direction of conveyor movement and having an open top extending transversely of the enrobing conveyor, the open grid mesh of said enrobing conveyor loosely lying across and contacting the front and rear edges of said second conveyor open top, and means continuously feeding liquid enrobing material into and filling said second container to overflow, whereby the bottom surfaces of the confections supported on said enrobing conveyor mesh pass through the pool of overflowing enrobing material of said second container.

* * * * *